Feb. 11, 1930.　　　J. L. CREVELING　　　1,746,726
ELECTRIC SYSTEM
Original Filed Dec. 7, 1925
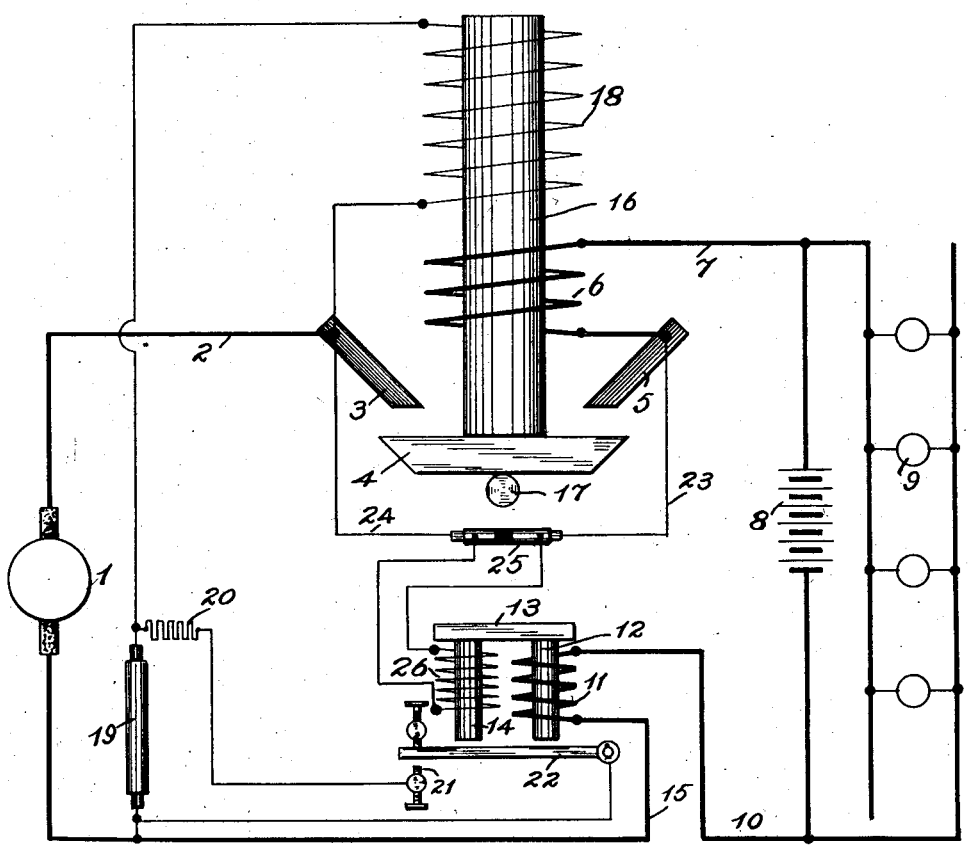
INVENTOR:

Patented Feb. 11, 1930

1,746,726

UNITED STATES PATENT OFFICE

JOHN L. CREVELING, OF NEAR TUCSON, ARIZONA, ASSIGNOR, BY MESNE ASSIGNMENTS, TO SIMPLEX EQUIPMENT COMPANY, INC., OF NEW YORK, N. Y., A CORPORATION OF DELAWARE

ELECTRIC SYSTEM

Application filed December 7, 1925, Serial No. 73,540. Renewed June 7, 1929.

My invention pertains to that class of electric systems wherein a dynamo or generator is used to charge a storage battery and operate lamps or other translating devices which are supplied by the battery when the dynamo is inoperative. As such systems are particularly applicable for the lighting of railway cars where the dynamo is driven at variable speed and subjected to stopping and starting, my invention will be described with particular reference to such a carlighting system.

The drawing is a diagrammatic representation of one type of system comprehending the elements of my invention.
The principal object of my present invention is to provide automatic means for connecting the generator with the storage battery when their electromotive forces are substantially equal and as nearly as possible exactly equal, and to disconnect the generator from the battery when the electromotive force of the generator is very slightly below that of the battery so as to prevent more than a negligible back discharge from the battery therethrough.

It is a further object of my invention that the generator shall be connected with and disconnected from the battery in the proper manner throughout a considerable change in battery voltage which, in practice, is more or less variable within certain reasonably wide limits, which may depend upon the condition of charge of the battery. In many practical operating systems in use to-day, the voltage at which it is desirable to connect the generator and the battery varies from 28 to 40 volts, or thereabouts.

Referring to the drawing, 1 represents a dynamo or generator which may be of any suitable type as ordinarily used for the lighting of a railway car, it being understood that the generator is provided with a proper regulating means to compensate for reversals in direction of rotation and for speed changes in such manner that the generator is suitable for charging the storage battery and maintaining the lamps or other translating devices whenever its speed is above a predetermined value. As such generators, together with their regulating devices, are now common articles of commerce and well known in the art, details, further than the mere diagrammatic representation of such a machine, are omitted for the sake of simplicity and clearness in illustration.

The dynamo 1 has its positive brush connected as by wire 2 with the flexible brush 3, adapted to make contact with the conducting member 4 when said member 4 is sufficiently raised. 5 is a flexible brush similar to that shown at 3 and connected through the solenoid 6 with the wire 7 which is carried to the positive side of the storage battery 8 and the positive side of the lamps or other translating devices indicated at 9,—return from the translating devices 9 and the battery 8 being made to the generator through the wire 10, coil 11 and wire 15. The coil 11 surrounds the core 12, of iron or other magnetic material, carried by the yoke 13, of like material, which supports a similar core 14. The contact member 4 is united to a core 16, of iron or other magnetic material, within the coil 6 and normally tends to assume the position shown in the drawing, with the contact 3—4—5 broken and the member 4 resting upon the stop 17. 18 is a voltage winding tending when energized to raise the core 16, and is placed across the generator leads through a resistance 19, around which there is placed a suitable shunt containing a resistance 20, contact lever 22, and adjustable contact screw 21, lever 22 serving as a keeper for the relay or electromagnetic device having the cores 12 and 14. The brush 5 is connected as by wire 23 with one of the conducting ends of the unit 25, which is in connection with one end of the winding 26 upon the core 14, the opposite end of said winding being connected with the other conducting portion of the unit 25, which in turn is connected with the brush 3, as by wire 24, and, therefore, the coil 26 is in circuit across the brushes 3 and 5. The coil 26 is preferably of very fine winding, of sufficient resistance to replace the ordinary resistance unit used in many of the systems in practice, in the position indicated by the divided unit 25 in the drawing, it being common practice to use, in place of 25, a high resistance unit which allows a very slight back discharge from the battery to the generator when the generator is at rest, so as to insure proper picking up of the generator when the same is set in motion.

An operation of my invention is substantially as follows:

If the generator be at rest or running at sufficiently low speed, the contact 3—4—5 will be open and the members 4 and 16 will rest upon the stop 17 in the position indicated in the drawing. Current will flow from the battery through coil 6, wire 23, winding 26 and wire 24, brush 3 and wire 2 to generator 1; return from the generator to the battery being made through wire 15, coil 11 and wire 10. The resistance of the coil 26 is so high that this current causes no appreciable drain upon the battery, and this current is so small that its effect in passing through coil 6 and coil 11 is negligible. However, its passage through the voltage coil 26 causes it to hold the keeper 22 in the position shown in the drawing, and the contact 21—22 remains broken so long as there is any appreciable difference in voltage between the generator and the battery, it being readily understood that the magnetic circuit of 12—13—14—22 may be of very low reluctance, and the keeper 22 held close to the pole pieces by an exceedingly small current in the many windings of the coil 26; or, in fact, by a current of very close to zero value. If now the generator be started, current will flow through the winding 18 and resistance 19, and as soon as the generator attains any appreciable voltage, coil 18 will tend to raise the core 16 and close the contact 3—4—5. And I so choose the resistance 19 that, so long as all the current in the coil 18 passes therethrough, the said coil will not be able to lift the core 16 unless a voltage across the generator be reached in excess of that attained in service. Therefore, while the contact 21—22 remains open, the members 4 and 16 will remain in the positions shown in the drawing. If the voltage upon the generator be increased until it is equal to that of the battery 8, then the current in the coil 26 will fall to zero and the keeper 22 will be allowed to fall upon the contact screw 21 and close the circuit of the shunt 20 around the resistance 19. And I so choose the resistance 20 that, when it is thrown in shunt to 19, the coil 18 will lift the core 16 and close the contact at 3—4—5, provided the generator have its voltage above the minimum voltage at which it is desired to ever close the circuit at 3—4—5. Therefore, as soon as the voltage of the generator and battery balance, in normal operation, the shunt 20, by being thrown around the resistance 19, causes the coil 18 to instantly close the connection at 3—4—5 and connect the generator with the battery at substantially no difference of potential between them. If, now, the generator voltage be increased, current flowing from the generator through the battery and translating devices will transverse the coil 6 and assist the coil 18 in maintaining a good contact at 3—4—5. This current will also traverse the coil 11 and cause it to attract the keeper 22 and break the circuit of resistance 20 around the resistance 19. Therefore, the coil 18 will be so weakened that it would not be able to close the contact 3—4—5, but may be strong enough to hold the same closed after once established, as it requires less current in 18 to maintain the contact than to lift the core 16 and establish it. If the generator continues to operate at sufficient speed, the battery and translating devices may be supplied in an obvious manner. If, now, the generator slow down until it is supplying no current, there will be no current in the coil 11 and substantially no current in the coil 26 owing to the fact that it is shunted out by the contact 3—4—5, and the lever 22 will fall upon 21 and establish the shunt around the resistance 19. This will cause the contact 3—4—5 to remain closed so long as there is no back discharge through the generator, and thus prevent "chattering" at this critical point. However, if the generator voltage fall very slightly, a slight back discharge through 6 will tend to weaken the effect of coil 18, and a very slight back discharge through the coil 11 will lift the keeper 22 and break the contact at 21; whereupon the core 16 will immediately descend, opening 3—4—5, and rest upon the stop 17. The contact 3—4—5 now being broken and the generator voltage being slightly below that of the battery, coil 26 will maintain the keeper 22 in the position shown in the drawing, breaking the contact at 21, and, therefore, cause the contact 3—4—5 to remain broken until the generator voltage again equals that of the battery, when the above outlined cycle will be repeated.

From the foregoing it will be noted that I have produced a system wherein, regardless of the battery voltage within the limits of operation, the generator and battery will always be connected at substantially equal voltages and disconnected whenever the voltage of the generator falls very slightly below that of the battery, in such manner as to prevent more than a mere negligible back discharge. It will also be noted that this is brought about by rugged mechanism which may be very easily employed with many systems now in use, the majority of which have in their construction the elements 3, 4, 5, 6, 16 and 18, and resistance units of the readily removable type connected as indicated at 25 and 19, which may be readily replaced with the instrumentalities I have indicated in said places.

I do not wish in any way to limit myself to any of the details of construction or modes of operation herein given to illustrate an embodiment of my invention for it will be obvious that wide departure in the way of details, both in construction and operation, may be made without departing from the spirit and scope of my invention which is as set forth in the following claims.

I claim:

1. The combination with a variable speed generator, a storage battery charged thereby and an automatic switch adapted to connect the generator and battery at a predetermined generator voltage, of external means for controlling the operation of said switch affected by current carried by said switch and comprehending a coil across the break caused by said switch.

2. The combination with a generator, a storage battery charged thereby and automatic means for connecting and disconnecting the generator and said battery comprehending a coil in shunt to the generator tending to cause such connection, of means for affecting the energization of said coil comprising an independent coil in shunt around the connection and means cooperating therewith affected by current through said connection.

3. The combination with a generator, a storage battery charged thereby, and means for connecting said generator and said battery comprehending a coil deriving current from the generator whenever operative, of a coil for affecting the energization of said first-mentioned coil traversed by current from the battery to the generator under certain conditions and by current from the generator to the battery under other conditions and means affected by current through said connection cooperating with said last-named coil.

4. The combination with a generator, a storage battery charged thereby and means for connecting said generator and said battery comprehending a coil deriving current from the generator whenever operative, of a coil for affecting the current in said first-mentioned coil traversed by current from the battery to the generator when the battery voltage exceeds that of the generator and by current from the generator to the battery when the generator voltage exceeds that of the battery and means affected by current through said connection cooperating with said last-named coil.

5. The combination with a generator and a storage battery charged thereby, of means for connecting said generator and said battery comprehending a voltage coil permanently across the generator, a voltage coil in shunt around the point of connection between the generator and battery and means operated thereby and affected by current through said connection for affecting the current in said first-mentioned voltage coil.

6. The combination with a generator and storage battery charged thereby, automatic circuit-manipulating means controlling the connection of the generator with said battery, including a coil always receiving current from the generator when operative for operating said circuit-manipulating means, and means for controlling the operation of said manipulating means comprehending a high resistance winding permanently in shunt around a portion of said manipulating means and a coil in series with said portion.

7. The combination with a generator and a storage battery charged thereby, and automatic circuit-manipulating means controlling the connection of the generator with said battery having a coil permanently in shunt relation to the generator for operating said circuit-manipulating means, of means for controlling the operation of said manipulating means comprehending a high resistance winding permanently in shunt around a portion of said manipulating means, and means operated by said shunt winding for controlling the operating coil said last-named means being also affected by current controlled by the manipulating means.

8. The combination with a generator, a storage battery charged thereby, and automatic means for making and breaking the connection between the generator and the battery including operating means functionally affected by variations in generator voltage, of means for controlling the effective voltage upon said operating means comprising a high resistance coil permanently connecting the battery and generator and means affected by current supplied to the battery.

9. The combination with a generator, a storage battery charged thereby, and automatic means for making and breaking the connection between the generator and the battery including operating means functionally affected by the value of generator voltage, of means for controlling the operation of said operating means comprising a high resistance coil permanently connecting the battery and generator and means operated by said high resistance coil for controlling the voltage upon the operating coil said last-named means being also affected by current controlled by the making and breaking of said connection.

10. The combination with a generator, a storage battery charged thereby, automatic means for making and breaking the connection between the generator and the battery including operating means functionally affected by changes in generator voltage, of means for controlling the effect of said changes upon the operating means comprising a high resistance coil permanently connecting the battery and generator, means operated by said high resistance coil for affecting the current in the operating coil and a coil in series with the generator affecting said last-named means.

11. The combination with a variable speed generator, a storage battery charged thereby and an automatic switch adapted to connect the generator and battery at a predetermined generator voltage, of external means for controlling the operation of said switch comprehending a coil across the break caused by said switch and a coil in series with said break.

12. The combination with a variable speed generator, a storage battery charged thereby and a switch for connecting and disconnecting the generator and battery including operating means affected by generator voltage, of means for affecting the operation of said switch comprehending a coil across the break caused by said switch, and a coil in series with said break, which coils have their operative effects unaffected by changes in the direction of current therethrough.

13. The combination with a variable speed generator, a storage battery charged thereby and an automatic switch adapted to connect the generator and battery at a predetermined generator voltage, of means applied thereto for causing the same to connect the generator and battery when their voltages are substantially equal throughout variations in battery voltage including means for affecting the operation of the switch comprehending a coil around the circuit controlling portion thereof and a coil in series with said portion.

14. The combination with a variable speed generator, a storage battery charged thereby and an automatic switch adapted to connect the generator and battery at a predetermined generator voltage, of means applied thereto for causing the same to connect the generator and battery when their voltages are substantially equal throughout variations in battery voltage including means for affecting the operation of the switch comprehending a coil operative when the switch is open and a coil operative when the switch is closed.

15. The combination with a variable speed generator, a storage battery charged thereby and an automatic switch adapted to connect the generator and battery at a predetermined generator voltage, of means applied thereto for causing the same to connect the generator and battery when their voltages are substantially equal throughout variations in battery voltage including means for affecting the operation of the switch comprehending a coil operative when the switch is open and a coil operative when the switch is closed, the operation of said switch serving to select which coil may be operative.

JOHN L. CREVELING.